2,867,590

COMPOSITION COMPRISING MELAMINE-ALDEHYDE, α-ALKYL-D-GLUCOSIDE AND DICARBAMATE COMPOUND

Alexander Coutras, South Norwalk, and Ivor H. Updegraff, Stamford, Conn., assignors to American Cyanamid Company, New York, N. Y., a corporation of Maine No Drawing. Application December 31, 1956
Serial No. 631,405

16 Claims. (Cl. 260—17.3)

The present invention relates to improved thermosetting resin compositions and to the resulting products and more particularly to certain modified melamine resins.

An object of the invention is to provide a thermosetting resin which has improved properties during curing.

Another object of the invention is to provide hardened resins of improved physical properties.

A further object of the invention is to provide hardened resin surfaces capable of being buffed to a higher gloss.

Other objects and advantages of the invention will be apparent to those skilled in the art especially after consideration of the detailed disclosure hereinbelow.

The present invention includes compositions which comprise a polymerizable melamine-aldehyde condensate modified with a minor portion of modifiers comprising between about 1 and about 5 parts of an alpha alkyl-D-glucoside and between about 1 and about 5 parts by weight of a substance of the group consisting of dicarbamates and aldehyde condensation products thereof, which dicarbamates have the formula:

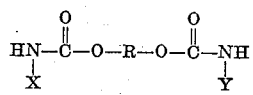

wherein R is a saturated aliphatic radical containing two to ten carbon atoms, and X and Y each represent a member of the group consisting of hydrogen atoms and alkyl radicals. The hardened or cured products of the polymerization of the above compositions are also part of this invention. Narrower aspects of this invention relate to preferred ingredients and proportions.

The novel modified melamine-aldehyde resins have many advantages over unmodified versions of the same melamine resins. During curing, that is, while they are fusible during a molding or laminating operation, they are considerably more plastic than the unmodified resins in that there is a considerably greater length of flow during the same time interval at a given temperature relative to the same resin without modifiers. In addition, the physical characteristics of the molded or laminated article are distinctly superior in other respects. The novel resins in the hardened state absorb considerably less water both at atmospheric and elevated temperatures, hence they display considerably greater water resistance, a feature which is particularly important in the manufacture of electrical apparatus or components thereof. A striking improvement in dimensional stability is also achieved, because molded articles display much less mold shrinkage; also, both molded and laminated articles shrink less during aging at elevated temperatures. An outstanding improvement in the polishing characteristics of the articles is also noticeable as they can be buffed to an even higher gloss than is produced by the molding or laminating operation. Buffability is important as it permits repairing minor blemishes on large laminates which would otherwise be rejected. On the other hand, unmodified melamine resins show little or no increase in gloss after buffing. In addition, the new resin compositions show less tendency to crack around molded inserts. Finally, there is a noticeable improvement in clarity in the objects produced from the present resins which is particularly apparent in the use of the new resins in the overlay sheet which is superimposed over a decorative print sheet in laminates.

The glucoside component of the modifying combinations in the novel compositions is selected from the very narrow class of alpha alkyl-dextro-glucosides. This group is exemplified by alpha methyl-D-glucoside, alpha ethyl-D-glucoside, alpha propyl-D-glucoside, alpha isopropyl-D-glucoside, and the various normal, secondary and tertiary alpha butyl-D-glucosides; however, the best results are usually obtainable with alpha methyl-D-glucoside.

The alpha alkyl-D-glucoside employed as the modifier in the present invention may be added to the aminoplastic resin at any time prior to the cure of the resinous material. Thus, the glucoside may be added to the resinous syrup to obtain a homogeneous mixture which may then be spray-dried in accordance with procedures well known in the art. The resinous syrup containing the modifier may also be dried in accordance with other procedures well known, such as vacuum concentration, drum drying, and the like. If desired, the resinous composition may be initially dried and the glucoside then introduced into the composition as a dry blend. When preparing a molding composition, the modifier may be added with a suitable filler to the resinous syrup which is then homogenously blended and dried to form the molding composition. The resinous composition thereby obtained is water-dilutable and is comparable to an unmodified aminoplastic resin in this respect, whereas known modified aminoplastic resins usually require the presence of alcohol or other solvent in the system for dilution. The water-solubility of the composition obviously leads to easy cleaning of the treating equipment after it is used. While the modified composition is, prior to its cure, water soluble or dilutable, when cured, the aminoplastic has an increased water-resistance and also improved dimensional stability. Also, lesser amounts of the modified aminoplastic resin may be employed in certain laminating operations than was previously required when unmodified aminoplastics were used.

The dicarbamate or urethane compounds employed in the modifying combinations described herein are preferably but not necessarily condensation products of any of the aldehydes mentioned hereinbelow, and the ratio of aldehyde to the dicarbamate ester is desirably between about 1:1 and 4:1, respectively, and the ratios about 1.5:1 to about 2.5:1 usually appear to give the best results. Formaldehyde and formaldehyde-engendering substances are preferred for the purpose. The reaction provides 1 or 2 methylol or other alcohol groups on one or both of the nitrogen atoms of the compound in lieu of the original hydrogen atoms.

Suitable dicarbamates are best described in terms of the following formula:

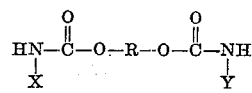

wherein R is a saturated aliphatic radical containing from 2 to 10 carbon atoms, and X and Y each represent a hydrogen atom or an alkyl radical, especially one containing from 1 to 4 carbon atoms as exemplified by methyl, ethyl, isopropyl, n-butyl and tert-butyl groups. These compounds are diesters of carbamic acid or a monosubstituted carbamic acid with any glycol containing from 2 to 10 carbon atoms, including, inter alia, ethylene glycol, diethylene glycol, tetraethylene glycol, 1,2- and 1,3-propylene glycols, 1,2-, 1,3- and 1,4-butylene glycols and the various pentanediols, hexanediols, heptanediols, octanediols, and decanediols. Thus, the radical in the above formula may represent either groupings, that is oxyalkylene radicals, as well as alkylene groups. A few of the many suitable dicarbamate esters are triethylene glycol bis(N-butyl carbamate), 1,4-octanediol dicarbamate, 1,10-decanediol dicarbamate and those named elsewhere in this specification.

The diurethane condensation products employed in the novel compositions may be prepared by reacting a glycol with urea and later optionally condensing the resulting dicarbamate ester with an aldehyde. For example, a mixture of 2 mols of 1,4-butylene glycol, 5.3 mols of urea, 200 parts xylene (reaction medium) and 4 parts of stannic chloride (catalyst) are reacted for 8 hours at the reflux temperature of 137–141° C., then the xylene above the crystalline product is siphoned off as far as possible and the remaining xylene is distilled off after the addition of several hundred parts of water. The product is washed once or twice with similar quantities of water to remove unreacted urea; next, it is filtered using suction, and the crystalline filter cake is dried to yield butylene glycol dicarbamate in 334 parts or 95% of theory based upon the glycol charged. The dimethylol derivative is made by reacting 730 parts of the glycol dicarbamate with 730 parts of 15% aqueous formaldehyde and 5 parts of trisodium phosphate with stirring at 20–30° C. for 4 hours until the diurethane dissolves completely. A completely colorless solution of 1,4-butylene bis(N-hydroxymethyl carbamate) is obtained by stirring in 20 parts of activated charcoal, heating to 50–60° C. for two hours and filtering through a filter press.

The dicarbamate ester or urethane may be condensed with the aldehyde either alone or in admixture with melamine which is also being reacted with the aldehyde. No substantial differences have been noticed between resins which are simple physical mixtures and those in which both the glycol dicarbamate and the melamine are reacted with an aldehyde simultaneously. When one of the novel modified melamine resins is formulated by simple mixing or blending rather than co-condensation, the dicarbamate-aldehyde condensate may be added thereto in the manner described earlier in respect to introduction of the glucoside.

The melamine-aldehyde condensates, their preparation and their use in laminating and molding compositions, are so well known as to require no specific description here except to mention that the present invention contemplates the modification of those resins which have aldehyde:melamine ratios between about 1.5:1 and about 3:1. While any of the aldehydes mentioned hereinbelow may be used in preparing the melamine resin of a modified nature, nevertheless, formaldehyde or formaldehyde-engendering substances are greatly preferred for the purpose.

Any one or more suitable aldehydes may be utilized as a reactant with both the melamine and dicarbamate ester in producing the aldehyde reaction products thereof. Formaldehyde, in an aqueous solution thereof, is preferred, but paraformaldehyde, hexamethylene tetramine or other compounds engendering formaldehyde also may be employed. Other aldehydes, for example, acetaldehyde, propionaldehyde, butyraldehyde, benzaldehyde, furfural, mixtures thereof or mixtures of formaldehyde with such other aldehydes or aldehyde may be employed. Requirements as to color and solubility, especially in water, as well as cost are the usual factors, well known to resin chemists, which govern the selection of an aldehyde.

The total amount of glucoside and dicarbamate compound should not exceed a minor proportion relative to the melamine-aldehyde condensate, that is, the weight of both of these modifying additives should not exceed that of the melamine resin on a dry basis. For laminating, it is preferred to maintain these modifiers at between about 1 and about 50% of the weight of the melamine-aldehyde condensation product. In general, the weight ratio of the glucoside to the dicarbamate compound may range from about 1:5 to about 5:1, respectively, by weight, ratios between about 1:2 and 5:1, respectively, being preferred for laminating. The optimum effects appear to be secured in laminating compositions with between about 10 and about 30% of these modifiers, based on the weight of melamine condensate, in a weight ratio between 1:2 and 2:1.

Various fillers and reinforcements may be incorporated into the aminoplastic composition when it is desired to produce a molding composition. These additives, which may be introduced into the resinous composition at any suitable stage of its manufacture, include alpha cellulose, wood flour, walnut shell flour, calcined or natural asbestos in the form of a powder or short or long fibers, finely divided silicon carbide, carbon black, graphite, diatomaceous earth, slate dust, ground cuttings, e. g., cuttings of silk, rayon, nylon, or of cloth made from glass fibers, ground cork, etc. The proportions of filler may be varied as desired or as conditions may require. Thus, for example, depending upon the particular filler employed and the intended use of the molded article, the filler may constitute, for example, from 5 to 80% by weight of the molded composition. Obviously, in certain applications no filler will be present.

In the production of laminates, the sheets are saturated with a solution or syrup of the resinous material. Inasmuch as the modified resinous composition of the invention is water-soluble or dispersible, water is frequently the sole solvent of the solutions used for treatment of the laminating sheet. In certain instances it may be desirable to prepare a solution of the modified resinous composition in a water-acetone or water-alcohol solvent. Water-soluble alcohols such as methanol, ethanol, isopropanol, tertiarybutanol, and the like may be employed. The water-alcohol solution of the modified resinous composition is usually employed when the laminating sheets possess a minimum wet strength or when a sheet is employed which has a tendency to wrinkle or shrink when treated with a water solution of the resin. When used, the content of such alcohol or acetone seldom exceeds about 70% of the total weight of the solvent. The amount of the resin utilized in the solution will depend upon the particular type of sheet being treated, temperature of the solution, type of machine employed, etc. Generally a solution containing about 40% to about 50% by weight of solids is satisfactory; but it may be as low as about 20% to as high as about 60%. From solubility considerations the dicarbamate modifier component is generally present in aldehyde condensate form in laminating syrups. The amount of the modified resinous composition employed in the production of the laminates may vary from about 30% to about 80% by weight based on the total weight of said laminate. Obviously the amount of the resin present in the laminate will vary depending upon the ultimate use of the product and also among other things upon the type of sheet being treated. A resin content between about 40% and 70% by weight is generally satisfactory, the lower quantity being used for decorative print sheets and the higher for overlay sheets. After the sheets are impregnated, they are then dried at elevated temperatures to a suitable volatile content and the sheets are then assembled in multiples between molding press platens and cured at elevated temperatures, e. g. about 120–160° C., and pressures, e. g. about 250–2000 p. s. i., for periods of about 5–45 minutes to form laminated articles. In decorative laminates the overlay and the decorative sheets are both impregnated with the modified resin. In industrial laminates wherein the sheets are all of the same material all of the sheets may be treated with the modified resin. Sheets of fibrous materials, such as alpha cellulose, paper, glass, cloth, or cloth formed of silk, cotton, wool, rayons or other synthetic fibers, may be employed in either the lamination production or in the overlay sheet.

Dyes, pigments and other colorants may be incorporated into the resinous compositions of the invention to alter the visual appearance and the optical properties of the finished product. In certain instances, curing agents such as phthalic anhydride, paratoluene sulfonic acid, phthalic acid, benzoyl peroxide, and the like, may also be incorporated into the aminoplastics. Mold lubricants may also be incorporated into the compositions if needed to facilitate molding of the heat-curable convertable compositions to the insoluble and infusible state. Examples of suitable mold lubricants are zinc stearate, calcium stearate, glyceryl monostearate, and the like. Additional plasticizers or flow promoters may likewise be added. In general the various additives employed with melamine molding and laminating resins in the past may be used in the novel compositions. The additives herein discussed may be mixed with either the resinous composition or the modifiers before they are admixed with each other, or the components may be compounded or blended simultaneously. The novel resin compositions may be molded at temperatures between about 135 and about 180° C., and pressures between about 1000 and about 5000 p. s. i., for periods which depend upon the size and especially the cross section of the article and which may range from as high as 30 minutes to as low as 1 minute.

For a better understanding of the nature and objects of this invention, reference should be had to the accompanying examples which are of an illustrative rather than a limiting nature. All proportions therein are expressed in terms of weight unless otherwise stated.

Example 1

Reactants in the form of 4 mols of melamine and 9.7 mols of 37% methanol-free formaldehyde are charged into a closed reaction vessel equipped with a thermometer, agitator and reflux condenser and the slurry pH is adjusted to 8.4 with 20% sodium hydroxide. This mixture is heated at 80° C. for 10 minutes, and a clear solution is obtained; then 1.67 mols of ethylene glycol dicarbamate is introduced, and the temperature is increased to 100° C. More formalin containing an additional 0.8 mol of formaldehyde is added, and the reaction mixture is maintained at 100° C. for 50 minutes. Into the resulting clear syrup is dissolved 65 parts of alpha methyl-dextro-glucoside with thorough stirring. The resulting syrup has a solids content of approximately 67% by weight.

A mixture is made by thoroughly stirring 28.6 parts by weight of alpha cellulose into 100 parts of the syrup. This resin-saturated cellulose is dried to a content of 3.9% volatiles, and the dry mass is ball milled together with 0.085% phthalic anhydride as a catalyst, 0.5% glycerol monostearate as a mold lubricant, 0.2% zinc stearate as a mold lubricant and 0.1% of hexamethylene tetramine to stabilize the resin composition against a decrease in flow during molding as a result of prolonged storage. Upon molding this composition at 310° C., for about 5 minutes at 3750 p. s. i., it is found that the molded article displays an improved gloss, lower mold shrinkage, lower aging shrinkage, and lower water absorption in comparison with the results obtained by molding a conventional melamine-formaldehyde molding resin of 2:1 formaldehyde:melamine ratio containing the same additives except for the absence of the carbamate and glucoside.

In comparing the Peakes flows characteristics of the novel molding powder with the same conventional melamine resin formulation, it is found that the length of flow of the novel composition is considerably greater and the apparent viscosity is considerably lower in the case of the new modified resin at the various time intervals employed in this test.

Example 2

The following laminating resin formulation is a modification of a conventional melamine laminating resin in the form of spray dried condensation product of formaldehyde and melamine in a 2:1 molar ratio, respectively,

| | Parts by weight |
|---|---|
| Melamine-formaldehyde resin | 1190 |
| 1,4-butylene glycol bis(N-hydroxymethyl carbamate) 35% aqueous solution | 300 |
| Alpha methyl-D-glucoside | 105 |
| Water | 1305 |
| Total | 2900 |

Decorative print sheets and overlay saturating papers are impregnated in the above syrup and then dried under a battery of heat lamps to a resin content of 65.7–66.5% and a volatiles content of 3.45–3.17%. Decorative and solid laminates with up to 35 plies are laid up and cured for 15 minutes at 149° C. under a pressure of 1100 p. s. i. The samples have an excellent gloss, and buffing increases this to an even higher gloss. When a laminate is prepared using a similar syrup except for the omission of the dicarbamate and glucoside, a similar initial gloss is obtained, but buffing does not appreciably increase this gloss; hence the proportion of rejects for blemishes or other gloss imperfections cannot be reduced by buffing.

A laminate prepared from the modified resin is found to suffer a slight temporary swelling at the most, which swelling disappears completely within 24 hours, and no staining after contact for 16 hours with the following stain solutions. The stain solutions consist of separate aqueous solutions of 1% and 5% sodium hydroxide, 5% $Na_3PO_4$, 10% citric acid, and aqueous ammonia of 5% $NH_3$ content as well as pure water, acetone, and ethyl alcohol. Upon soaking two specimens of the laminates in water for 24 hours, it is found that the weight increase amounts to 0.21 and 0.23% respectively, and a 15 minute immersion in boiling water of other specimens of the same two laminates produces weight increases of 0.13 and 0.11%, respectively. After being maintained in an oven at 104° C. for 48 hours, it is found that a sample of a laminate has shrunk 3.2 mils per inch in a direction perpendicular to the machine direction of the paper in the laminate and 2.5 mils per inch in the direction parallel to the machine direction.

While a laminate prepared from the same melamine resin without the modifiers displays substantially the same stain resistance, it picks up about double the amount of water in each of the two absorption tests and shrinks approximately twice as much in each direction in the heat aging test.

Example 3

A laminating resin formulation is prepared from the following constituents:

| | Parts by weight |
|---|---|
| Melamine-formaldehyde resin—2:1 F:M ratio | 2550 |
| 1,4 butylene glycol bis(N-hydroxymethyl carbamate) 36% aqueous dispersion | 834 |
| Alpha methyl-D-glucoside | 150 |
| Isopropanol | 136 |
| Water | 2045 |
| Total | 5715 |

The above formulation contains 85% of the melamine resins, 10% of the dicarbamate compound and 5% of the glucoside on a dry solids basis.

A conventional overlay saturating paper is impregnated with the above syrup and dried to produce a paper having a resin content of 66.1% and 5.2% of volatiles, while a decorative print sheet is similarly processed to a resin content of 40.0 together with 4.7% of volatile matter. A laminate assembly is prepared by sequentially stacking three plies of a crepe paper impregnated with phenolic resin, two plies of a kraft paper impregnated with phenolic resin, then the decorative print sheet and finally the overlay sheet, the latter two sheets being those described above. A control assembly is similarly prepared and differs only in the omission of the glucoside and the methylolated dicarbamate ester from the laminating resin formulation.

Both of the laminate assemblies are cured simultaneously in the same press using a 7 minute heat up time followed by 20 minutes at 135–140° C. under a pressure of 1100 p. s. i. with the press being cooled almost to room temperature before unloading.

Strips of 2-inch width having their lengths perpendicular to the machine direction of the paper are cut from the laminates and subjected to postforming tests wherein they are heated to face temperatures of 282 and 288° F. by a radiant heater and then pressed by hand around a half-inch radius. It is observed that there are a considerably higher percentage of failures in this postforming test at both temperatures with the control sheet than occur with the laminate made with the modified resin.

The initial gloss of the laminate prepared with modified resin is good but not as high as that of the laminate described in Example 2; however buffing readily produces an excellent gloss on the instant laminate.

Example 4

The procedure of Example 2 is repeated with a laminating composition prepared by mixing the tetraethylene glycol-monoethyl urea-formaldehyde reaction product with the other ingredients listed.

|  | Parts by weight |
|---|---|
| Melamine-formaldehyde resin (2:1 F:M ratio) | 1190 |
| Tetraethylene glycol bis(hydroxymethyl-N-ethyl-carbamate) 35% aqueous solution | 100 |
| Alpha methyl-D-glucoside | 105 |
| Water | 1305 |
| Total | 2700 |

The resulting laminate is found to have properties similar to those of Example 2 and distinctly superior to a control produced with an unmodified melamine resin.

Example 5

A resin syrup is prepared by mixing the following:

|  | Parts by weight |
|---|---|
| Melamine-formaldehyde resin (2:1 F:M ratio) | 76 |
| 1,8-octanediol dicarbamate-formaldehyde condensate (1:2.5 molar ratio) 33% aqueous solution | 36 |
| Alpha propyl-D-glucoside | 12 |
| Water | 26 |
| Total | 150 |

Alpha cellulose in the amount of 43 parts by weight is thoroughly stirred into the entire quantity of the above resin syrup and the resulting mass is dried and molded as in Example 1. The appearance and physical properties of the resulting article and its flow characteristics during molding are very similar to those observed in Example 1.

Example 6

Another resin syrup is prepared containing 76 parts of melamine-formaldehyde condensate (F:M molar ratio—2:1), 12 parts of alpha propyl-D-glucoside and 50 parts of water is used to impregnate 43 parts of alpha cellulose. The impregnated mass is then dried with gentle heating to a content of about 4% volatiles and ball milled with 9 parts by weight of 1,8-octanediol dicarbamate plus the additives set forth in Example 1 and molded in the manner of that example. The flow characteristics of this composition during molding as well as the appearance and physical characteristics of the final article are closely similar to the molded product of Example 5.

While only a few embodiments of the present invention are disclosed hereinabove, it will be appreciated that many more embodiments falling within this inventive concept are apparent to those skilled in the art. Accordingly, it should be understood that compositions of the present invention are not limited to any of the details disclosed herein unless stated in the appended claims or required by the prior art.

We claim:

1. A composition of matter which comprises a polymerizable melamine-aldehyde condensate plasticized with a minor portion of modifiers comprising between about 1 and about 5 parts of an alpha alkyl-D-glucoside wherein the alkyl group contains from one to four carbon atoms and between about 1 and about 5 parts by weight of a substance of the group consisting of dicarbamates and aldehyde condensation products thereof, which dicarbamates have the formula:

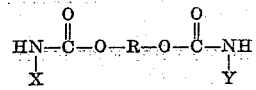

wherein R is a saturated aliphatic radical containing from 2 to 10 carbon atoms, and X and Y each represents a member of the group consisting of hydrogen atoms and alkyl radicals.

2. A composition according to claim 1 in which both of said aldehydes comprise formaldehyde.

3. A composition according to claim 1 in which the melamine-aldehyde is melamine formaldehyde, said glucoside comprises alpha methyl-D-glucoside, and said formula represents butylene glycol dicarbamate.

4. A composition according to claim 1 in which the melamine-aldehyde is melamine formaldehyde, said glucoside comprises alpha methyl-D-glucoside, and said formula represents ethylene glycol dicarbamate.

5. A composition of matter which comprises a polymerizable melamine-formaldehyde condensate plasticized with between about 1 and about 50 percent, based on the weight of said condensate, of modifiers comprising between about 1 and about 5 parts of alpha alkyl-D-glucoside wherein the alkyl group contains from one to four carbon atoms and between about 1 and about 2 parts by weight of a formaldehyde condensation product of a dicarbamate having the formula:

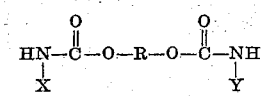

wherein R is a saturated aliphatic radical containing from 2 to 10 carbon atoms, and X and Y each represent a member of the group consisting of hydrogen atoms and alkyl radicals.

6. A composition according to claim 5 in which the glucoside comprises alpha methyl-D-glucoside.

7. A composition of matter which comprises a polymerizable melamine-formaldehyde condensate plasticized with between about 1 and about 50 percent, based on the weight of said condensate, of modifiers comprising between about 1 and about 5 parts of alpha methyl-D-glucoside and between about 1 and about 2 parts by weight of a formaldehyde condensation product of butylene glycol dicarbamate.

8. A composition of matter which comprises a polymerizable melamine-formaldehyde condensate plasticized with between about 10 and about 30 percent, based on the weight of said condensate, of modifiers comprising between about 1 and about 2 parts of alpha methyl-D-glucoside and between about 1 and about 2 parts by weight of a formaldehyde condensation product of 1,4-butylene glycol dicarbamate.

9. A composition of matter which comprises an infusible, insoluble heat-cured polymerization product of a composition according to claim 1.

10. A composition of matter which comprises an infusible, insoluble heat-cured polymerization product of a composition according to claim 2.

11. A composition of matter which comprises an infusible, insoluble heat-cured polymerization product of a composition according to claim 3.

12. A composition of matter which comprises an infusible, insoluble heat-cured polymerization product of a composition according to claim 4.

13. A composition of matter which comprises an infusible, insoluble heat-cured polymerization product of a composition according to claim 5.

14. A composition of matter which comprises an infusible, insoluble heat-cured polymerization product of a composition according to claim 6.

15. A composition of matter which comprises an infusible, insoluble heat-cured polymerization product of a composition according to claim 7.

16. A composition of matter which comprises an infusible, insoluble heat-cured polymerization product of a composition according to claim 8.

References Cited in the file of this patent

UNITED STATES PATENTS

| | | |
|---|---|---|
| 2,512,672 | Novotny et al. | June 27, 1950 |
| 2,773,788 | Magrane et al. | Dec. 11, 1956 |